US012683541B2

(12) United States Patent
Goodman et al.

(10) Patent No.: US 12,683,541 B2
(45) Date of Patent: Jul. 14, 2026

(54) FLUID-ORIENTING SOLAR ENERGY COLLECTION SYSTEM AND METHOD

(71) Applicant: Karogen LLC, Delray Beach, FL (US)

(72) Inventors: Kathy E. Goodman, Delray Beach, FL (US); Robert Sunstone, North Palm Beach, FL (US)

(73) Assignee: KAROGEN LLC, Delray Beach, FL (US)

( * ) Notice: Subject to any disclaimer, the term of this patent is extended or adjusted under 35 U.S.C. 154(b) by 0 days.

(21) Appl. No.: 19/387,738

(22) Filed: Nov. 13, 2025

(65) Prior Publication Data

US 2026/0142609 A1 May 21, 2026

Related U.S. Application Data

(60) Provisional application No. 63/720,823, filed on Nov. 15, 2024.

(51) Int. Cl.
| | |
|---|---|
| *H02S 20/32* | (2014.01) |
| *F15B 15/20* | (2006.01) |
| *B60P 3/00* | (2006.01) |

(52) U.S. Cl.
CPC .............. *H02S 20/32* (2014.12); *F15B 15/20* (2013.01); *B60P 3/00* (2013.01)

(58) Field of Classification Search
CPC ..................... H02S 10/00–40; H02S 20/00–32
USPC .................................................. 136/243–265
See application file for complete search history.

(56) References Cited

U.S. PATENT DOCUMENTS

| | | | |
|---|---|---|---|
| 2010/0186733 A1* | 7/2010 | Hoefler ................... | F24S 10/45 |
| | | | 126/625 |
| 2018/0212432 A1* | 7/2018 | Byrnes ....................... | F03D 9/10 |
| 2025/0392253 A1* | 12/2025 | Meyer ..................... | H02S 10/40 |

FOREIGN PATENT DOCUMENTS

WO    WO-2020165272 A1 *   8/2020   ............. H02S 20/00

* cited by examiner

*Primary Examiner* — Bach T Dinh
(74) *Attorney, Agent, or Firm* — Peter J. Van Bergen

(57) ABSTRACT

A solar energy collection system includes a base having a convex bottom and chambers within the base. A fluid partially fills each of the chambers. A pump coupled to the base is in fluid communication with each of the chambers. A solar energy collector is coupled to the base.

14 Claims, 13 Drawing Sheets

FLUID-ORIENTING SOLAR ENERGY COLLECTION SYSTEM AND METHOD

Pursuant to 35 U.S.C. § 119, the benefit of priority from provisional application 63/720,823, with a filing date of Nov. 15, 2024, is claimed for this non-provisional application.

FIELD OF THE DISCLOSURE

This disclosure relates generally to solar energy collection, and more particularly to methods and systems for the collection of solar energy using fluid to orient the system.

BACKGROUND

One of the greatest advantages of solar energy is that it is available virtually anywhere and for almost all daylight hours.

SUMMARY

Accordingly, it is an object of the present disclosure to describe efficient methods and systems for the collection of solar energy.

Another object of the present disclosure to describe methods and systems for the collection of solar energy that is readily optimized for morning and afternoon hours.

Other objects and advantages of the methods and systems described herein will become more obvious hereinafter in the specification and drawings.

In accordance with methods and systems described herein, a solar energy collection system includes a base having a convex bottom. The base has a set of chambers. A fluid partially fills each of the chambers. A pump is coupled to the base and is in fluid communication with each of the chambers. A solar energy collector is coupled to the base.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

Figure 1A:
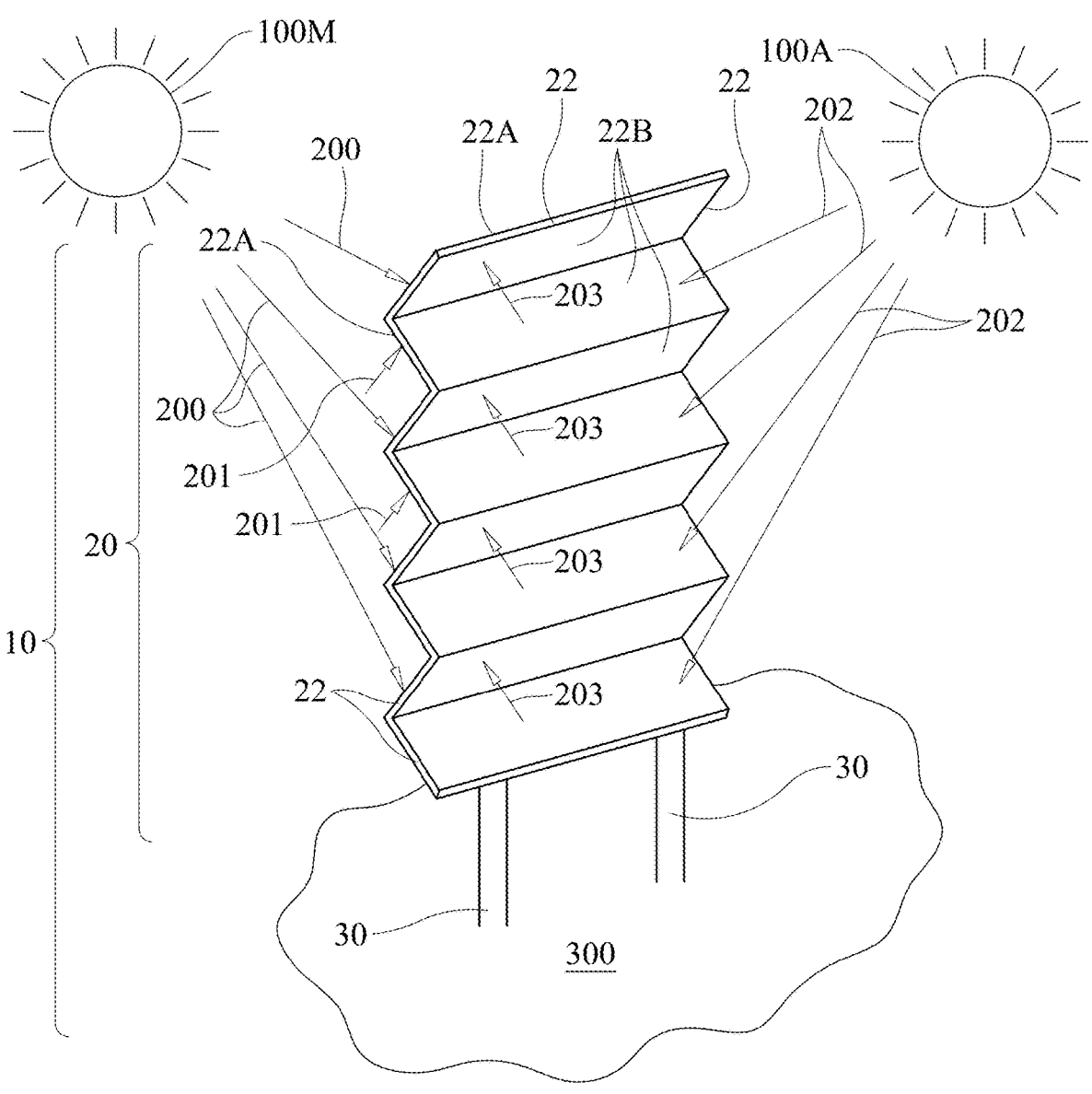
FIG. 1A is a perspective view of one embodiment of a portable solar energy collection system in accordance with various aspects as described herein.
Figure 1B:
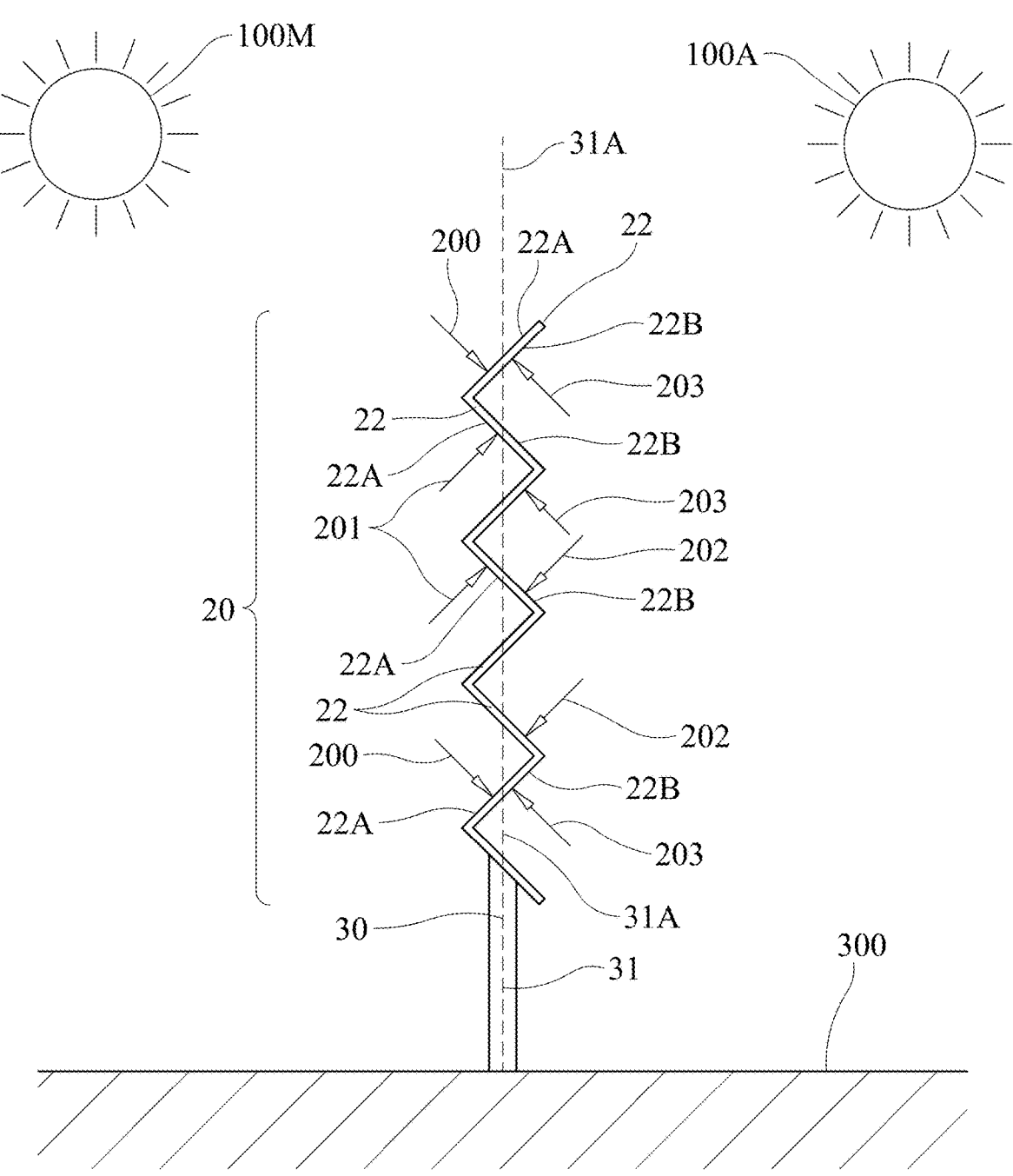
FIG. 1B is a side view of the embodiment of a portable solar energy collection system depicted in FIG. 1A in accordance with various aspects as described herein.

Referring now to the drawings and with simultaneous reference to FIGS. 1A and 1B, an embodiment of a portable solar energy collection system in accordance with the present disclosure is shown and is referenced generally by numeral 10. As will be described herein, system 10 provides a structure that may be positioned, oriented, and anchored at a location (e.g., on land or on water) that is exposed to solar energy emitted by the sun. In general, system 10 is positioned/oriented/anchored so that portions thereof directly receive solar energy from the sun during the morning hours as indicated in FIGS. 1A and 1B by morning sun 100M and solar energy arrows 200, and so that other portions thereof directly receive solar energy from the sun during the afternoon hours as indicated by afternoon sun 100A and solar energy arrows 202. In addition, system 10 is configured so that the portions of system 10 directly receiving the sun's morning solar energy 200 simultaneously indirectly receive solar energy (e.g., reflected and diffuse solar energy) during the afternoon hours as indicated by arrows 203, while the portions of system 10 directly receiving the afternoon solar energy 202 simultaneously indirectly receive solar energy (e.g., reflected and diffuse solar energy) during the morning hours as indicated by arrows 201.

Multiple embodiments and variations for the portable solar collection system will be described herein. It is to be understood that one or more the various features may be combined without departing from the scope of the present disclosure.

Figure 2:
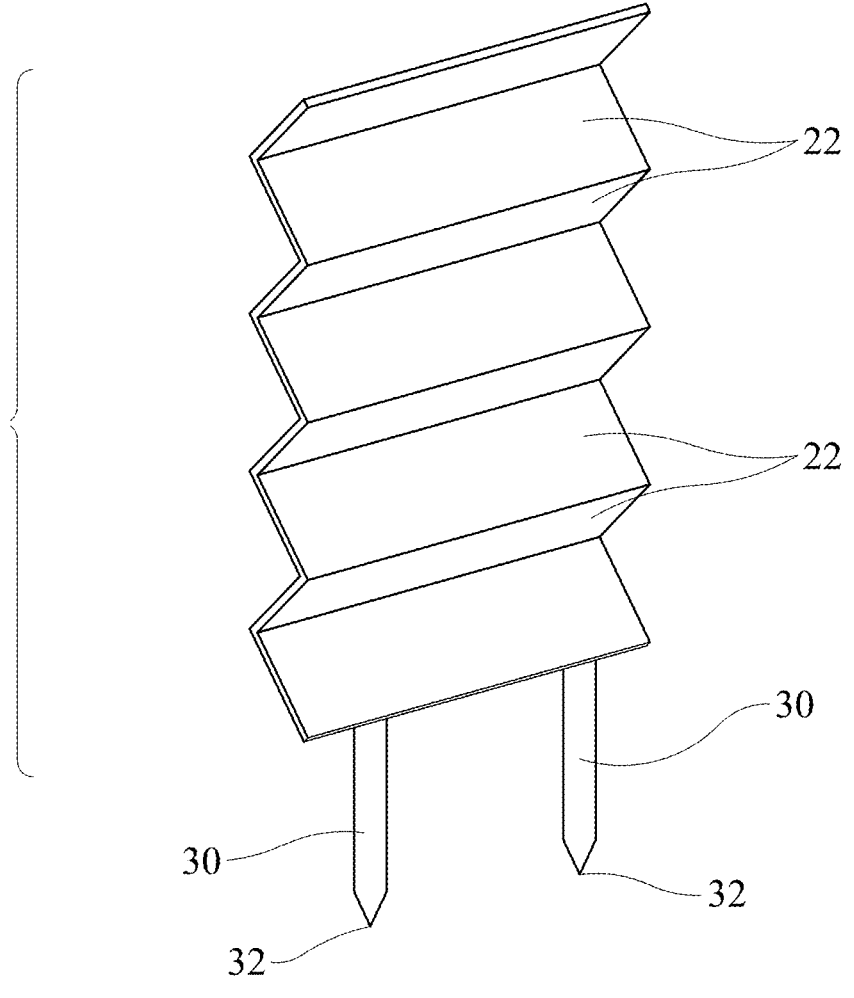
FIG. 2 is a perspective view of another embodiment of a portable solar energy collection system having spiked support legs in accordance with various aspects as described herein.

System 10 includes a solar energy collector 20 and rigid support legs 30 coupled or attached to one end of collector 20. In some embodiments and as shown in FIG. 2, the outboard ends 32 of support legs 30 may be pointed or spiked to facilitate their insertion into a ground region (not shown in FIG. 2) to thereby anchor system 10 to the ground region. In some embodiments and as will be described later herein, support legs 30 may be configured to be coupled to a base that will rest on a surface of a ground region. In some embodiments, a single rigid support leg may be coupled to collector 20. For example, a portion of the structure used for collector 20 that is unrelated to solar energy collection may extend from the collector to define a support leg structure. Accordingly, as used herein, the term "support leg" includes one or more support leg elements coupled to collector 20 for purposes of anchoring system 10.

Collector 20 is arranged in a triangular waveform. As is well-known in the art, a triangular waveform is defined by repeats of a linear rise leg and an adjacent linear fall leg. The combination of a linear rise leg and adjacent linear fall leg define what is known as a tooth of a triangular waveform. In accordance with the present disclosure, each leg of the triangular-waveform collector 20 is what will be referred to hereinafter as a "solar energy collecting (SEC) leg" referred to in the figures by numeral 22. Each SEC leg 22 is constructed to collect solar energy at each of its opposing faces 22A and 22B using one or more photovoltaic elements. For clarity of illustration, the photovoltaic elements are not specifically delineated in the figures. As used herein, the term "photovoltaic (or PV) element" refers to any of a variety of well-known pre-fabricated or printed materials, strips, cells, structures, etc., that convert solar energy to electric energy when the PV element is exposed to solar energy. The particular choice of materials and constructions for the PV elements are not limitations of the present disclosure. Although not illustrated for sake of clarity, collector 20 may include electric lines to connect the PV elements and may additionally or alternatively include water lines so that water contained in the lines is heated during solar energy collection.

Each SEC leg 22 may include monofacial PV elements that collect solar energy on only one face thereof or bifacial PV elements that collect solar energy on both faces thereof. For example, an SEC leg 22 may have monofacial PV elements on both of its opposing faces. In some embodiments, the two solar collecting and opposing faces of a bifacial PV element may be used to provide for solar collection at both faces of an SEC leg 22. As used herein, the term "bifacial" includes SEC leg constructions having photovoltaic elements on both faces of a SEC leg as well as constructions in which a bifacial's PV element(s) at one face of a SEC leg is optimized for maximum capture of direct sunlight, while the bifacial's PV element(s) at the other (opposing) face of the SEC leg is designed to collect reflected and diffused light. In some embodiments, collector 20 may be constructed from a combination of monofacial and bifacial PV elements. In some embodiments, SEC legs 22 may be formed via folds in a single sheet or film having PV elements deposited on one or both sides of the sheet/film.

In accordance with the present disclosure, support legs 30 are coupled to and extend from one end of collector 20. More specifically, the longitudinal axis 31 of the one or more support legs 30 is aligned with an imaginary line (or plane in the case of multiple support legs) indicated by dashed line 31A that intersects or bisects each SEC leg 22 as illustrated in FIG. 1B to thereby provide a balanced support for collector 20 in an open-air environment. Support legs 30 may be operable to anchor system 10 in place at a ground surface 300 as shown in FIGS. 1A and 1B such that collector 20 is positioned in an open-air environment above ground surface 300 with each tooth of the collector's triangular waveform defined by adjacent SEC legs 22 extending horizontally (i.e., substantially parallel) relative to a surface such as ground surface 300. To optimize solar collection efficiency and as shown in FIGS. 1A and 1B, collector 20 is oriented so that SEC legs 22 associated with one leg of each tooth of the triangular waveform are positioned to directly receive and collect the morning's solar energy 200 at their respective faces 22A, while SEC legs 22 associated with the other leg of each tooth of the triangular waveform are positioned to directly receive the afternoon's solar energy 202 at their respective faces 22B. More specifically, the SEC legs 22 oriented to directly receive the morning's solar energy 200 have their faces 22A tilted skyward towards the morning sun 100M, while their opposing faces 22B are titled towards ground surface 300. In a similar fashion, the SEC legs 22 oriented to directly receive and collect the afternoon's solar energy 202 have their faces 22B tilted skyward towards the afternoon sun 100A, while their opposing faces 22A are tilted towards ground surface 300.

The tilt angle of SEC legs 22 with respect to, for example longitudinal axis 31 or ground surface 300, may be fixed or adjustable without departing from the scope of the present disclosure. Tilt angles with respect to longitudinal axis 31 or ground surface 300 may be adjusted for optimization when the sun is lower in the sky (e.g., early morning, late afternoon, Winter etc.) or when the sun is higher in the sky (e.g. midday, Summer, etc.). Optimum tilt angles are primarily dependent on the latitude of the location where system 10 is deployed.

Figure 3:
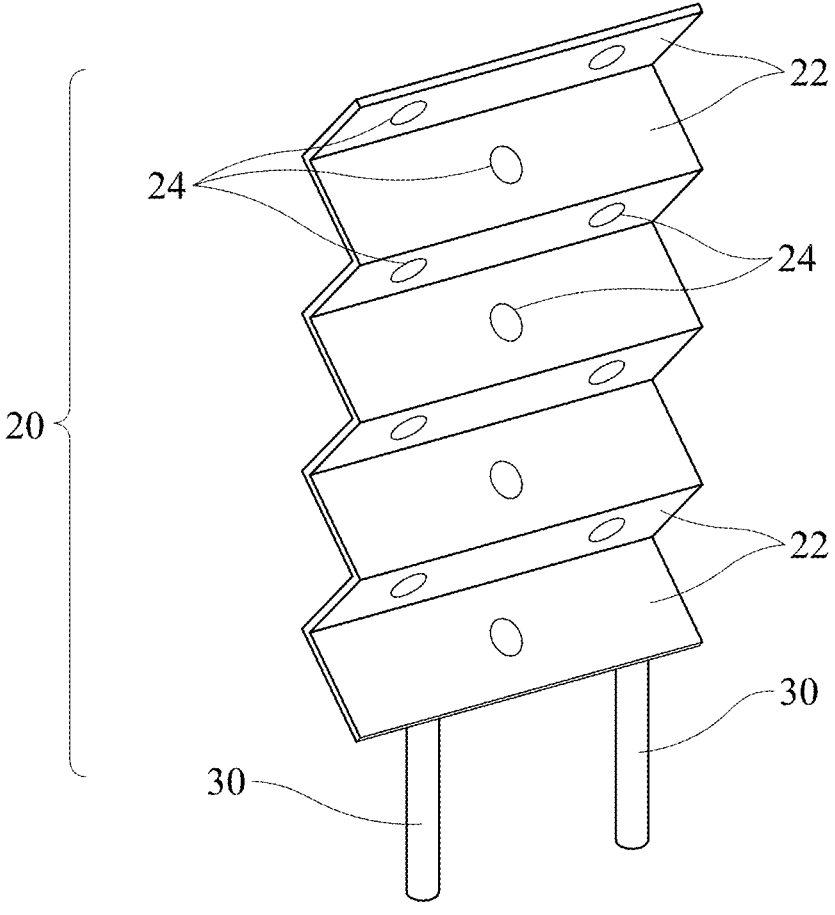
FIG. 3 is a perspective view of another embodiment of a portable solar energy collection system that includes regions configured for the passage of a flow of air in accordance with various aspects as described herein.

In some embodiments, it may be desirable to make the system's solar energy collector less susceptible to wind forces. For example, FIG. 3 illustrates another embodiment of a solar collector 20 having regions 24 that are configured to allow a flow of air to pass therethrough. Regions 24 may be realized by open holes (e.g., round holes, square holes, slot-shaped holes, etc.) or mesh screens in one or more SEC legs 22. Regions 24 may be located on any portions of collector 20 to include the transition or "fold" line between two SEC legs 22 without departing from the scope of the present disclosure. In some embodiments, regions 24 may be formed in SEC legs 22 as part of the solar panel manufacturing process. The shape, size, and number of regions 24 are not limitations of the present disclosure.

Figure 4:
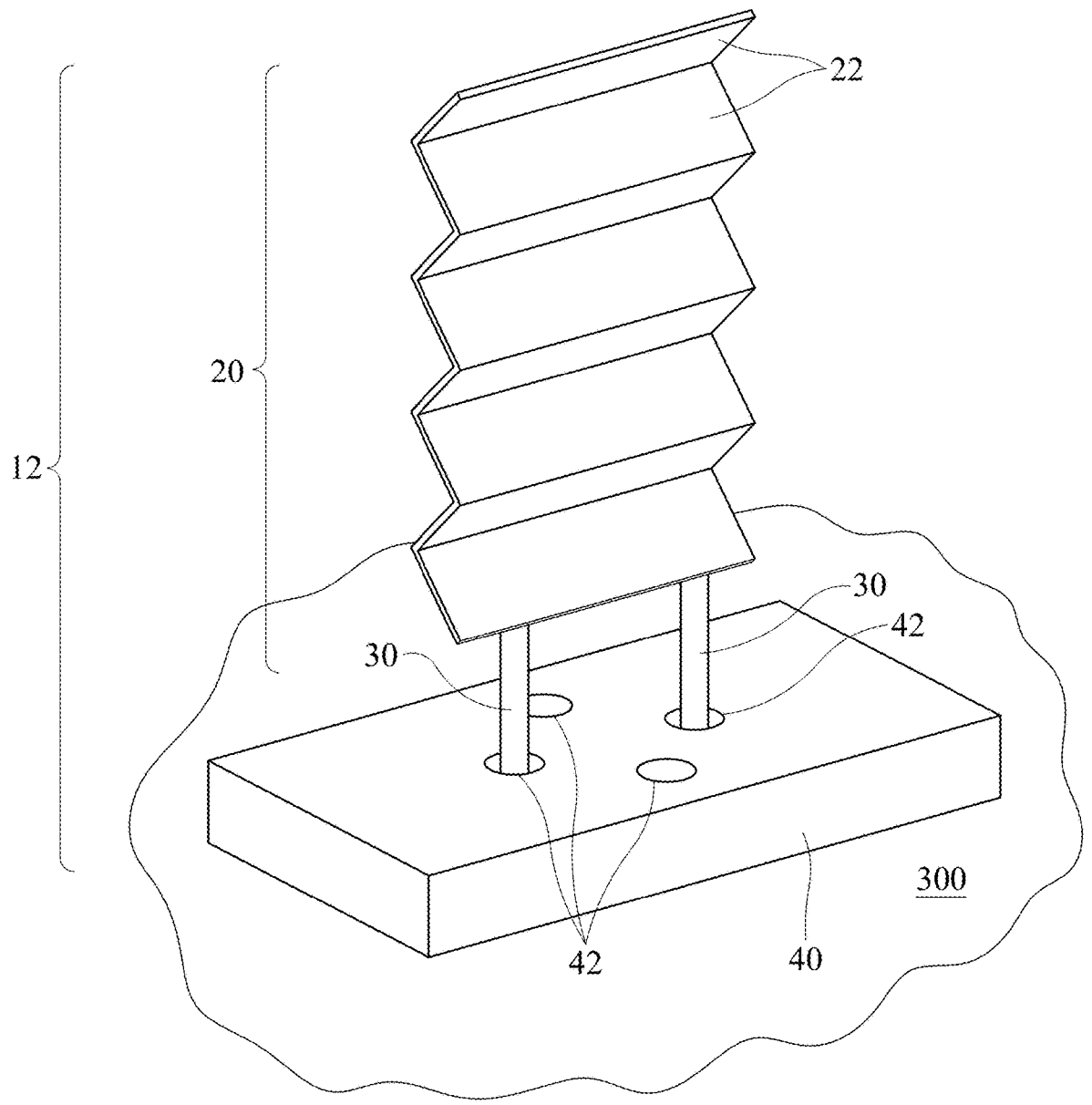
FIG. 4 is a perspective view of another embodiment of a portable solar energy collection system that includes a base in accordance with various aspects as described herein.

In some embodiments, a solar collection system in accordance with the present disclosure may be anchored in its desired location and orientation using a base. For example, FIG. 4 illustrates another embodiment of a solar collection system (referenced generally by numeral 12) that further includes a base 40 resting on a ground surface 300. Base 40 may be weighted by virtue of its construction materials and/or by the partial or complete filling of the base with weighting materials such as, but not limited to, sand, rocks, water, batteries for energy storage, etc. Base 40 may have multiple receptacles 42 with each receptacle 42 sized and shaped to receive and retain one of support legs 30. In some embodiments, receptacles 42 may be distributed about base 40 to provide for multiple orientations of collector 20.

Figure 5:
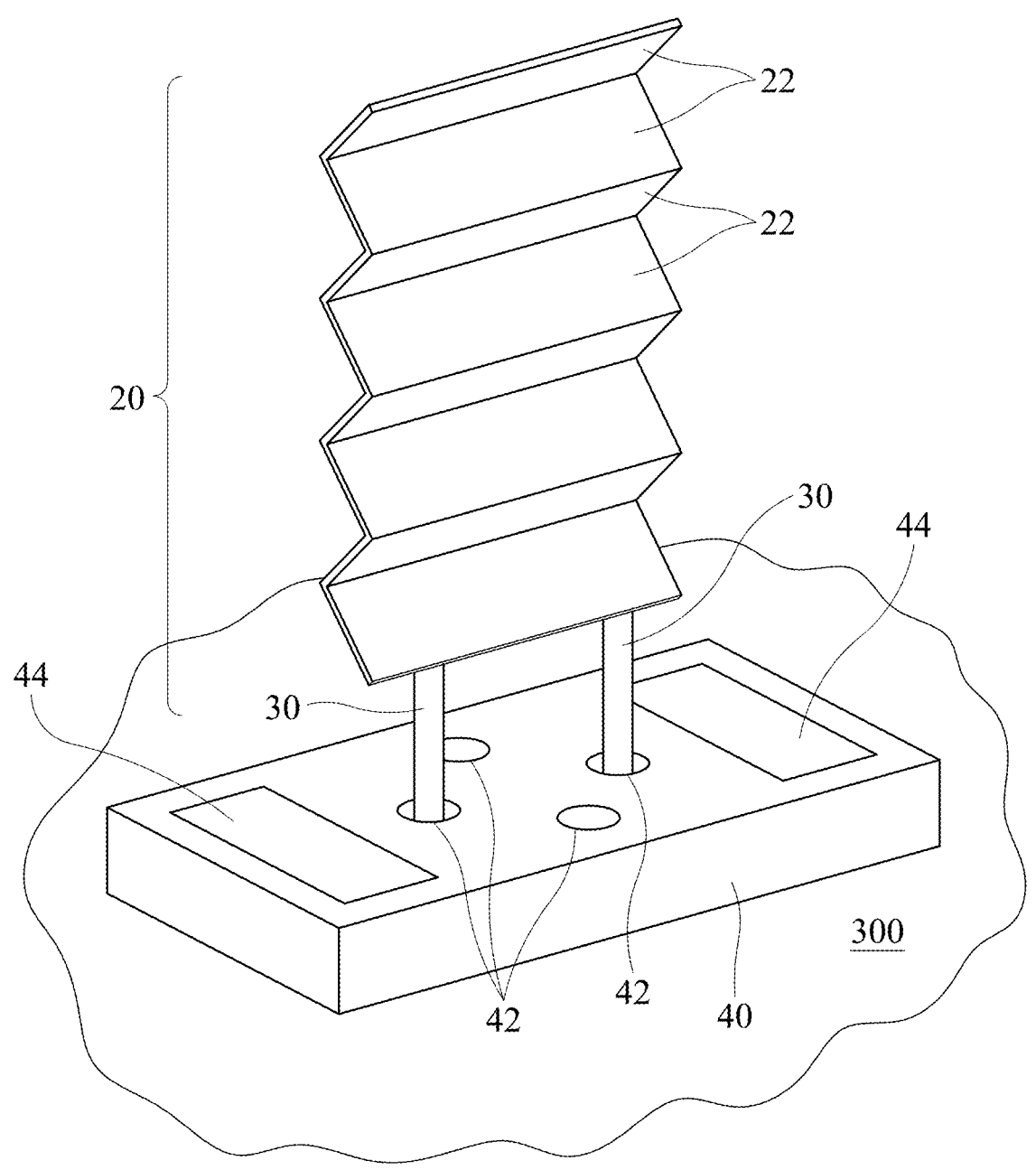
FIG. 5 is a perspective view of another embodiment of a portable solar energy collection system that includes a base with at least one additional photovoltaic element attached thereto in accordance with various aspects as described herein.
Figure 6:
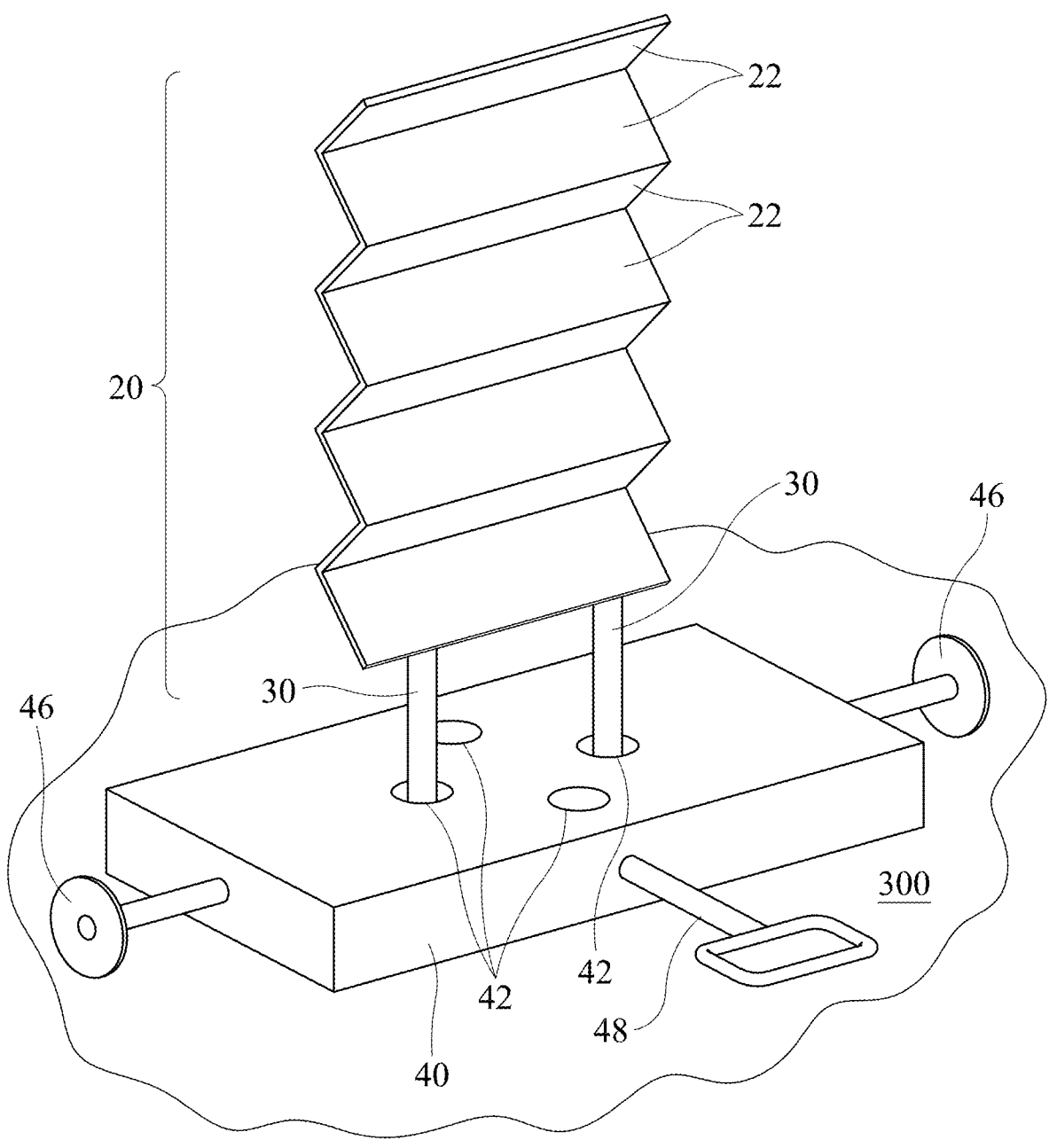
FIG. 6 is a perspective view of another embodiment of a portable solar energy collection system that includes a wheeled base in accordance with various aspects as described herein.

In some embodiments, the base could also serve as a mounting location for additional PV elements such as PV elements 44 attached to base 40 as illustrated in FIG. 5. The portions of base 40 that are to have additional PV elements 44 attached thereto may be shaped and/or angled to optimize solar energy collection for the morning, mid-day or afternoon hours. Referring to FIG. 6, base 40 may include wheels 46 to aid in the movement and maneuvering of base 40 on ground surface 300. In some embodiments and as shown in the illustrated example, the wheeled base may also include a handle 48 attached to base 40 to further facilitate movement and maneuvering of base 40.

Figure 7:
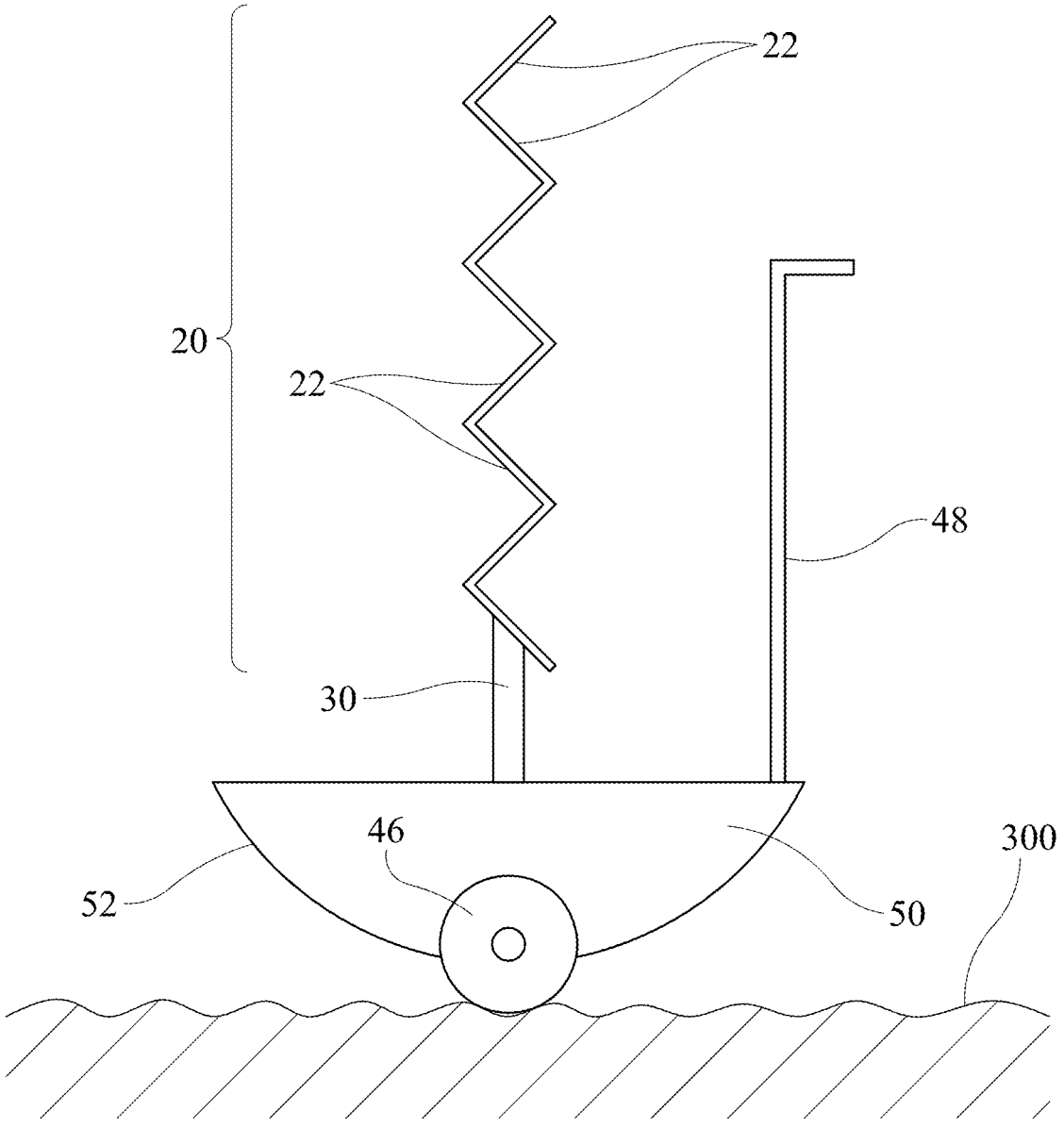
FIG. 7 is a side view of another embodiment of a portable solar energy collection system that includes a wheeled convex-bottom base in accordance with various aspects as described herein.
Figure 8:
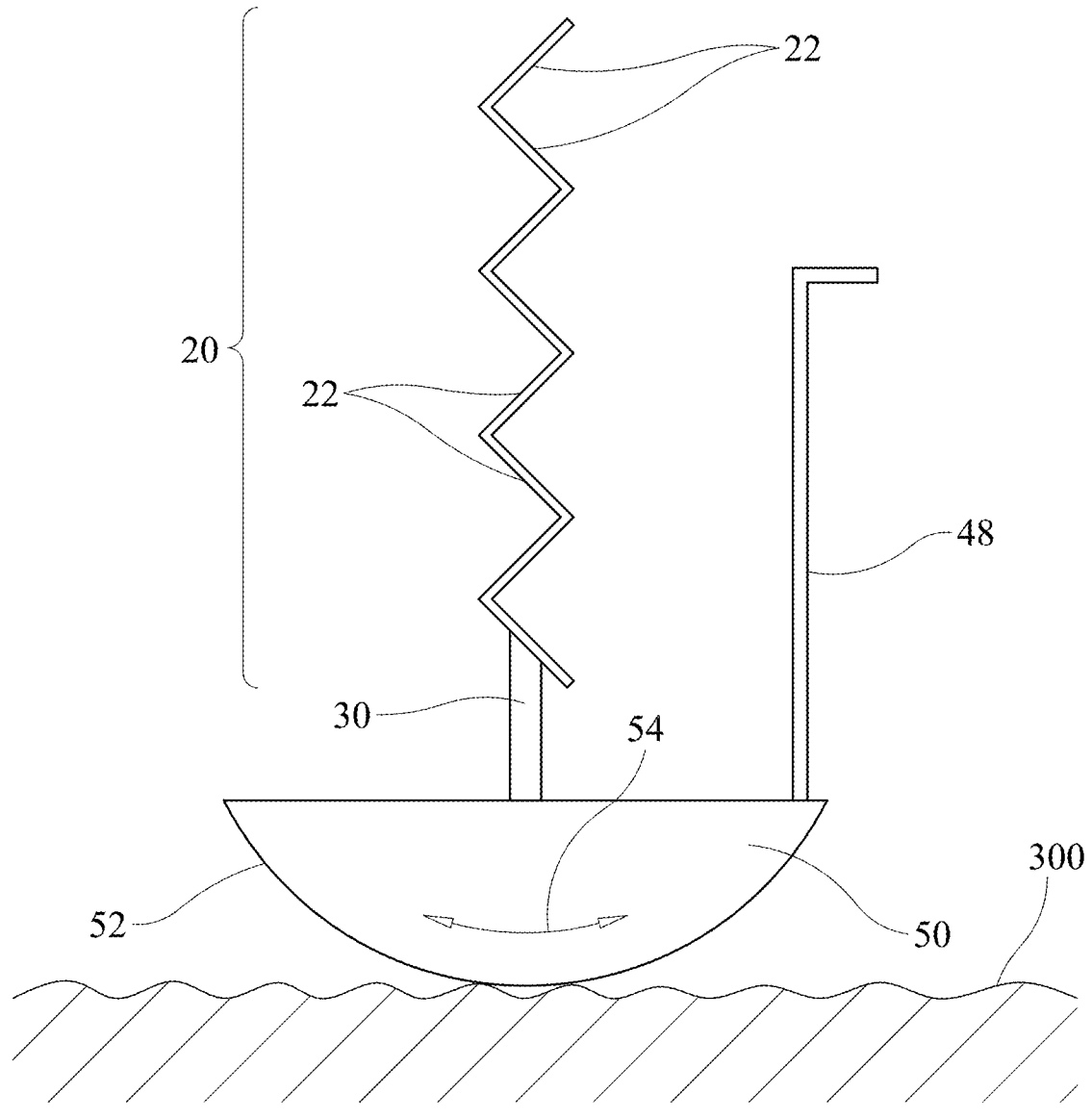
FIG. 8 is a side view of a portable solar energy collection system that includes a convex-bottom base for tilting on a ground surface in accordance with various aspects as described herein.

Referring now to FIG. 7, another type of base for use with a solar collection system of the present disclosure is shown and is referenced by numeral 50. Base 50 has a convex bottom 52 that makes it easier to move and maneuver base 50 over rough terrain. Base 50 may include the above-described wheels 46 and handle 48. The convex-bottom base 50 may also be useful when the base is maneuvered to orient collector 20 at a location on ground surface 300. In addition, the convex-bottom base 50 may allow the system to adapt to wind forces. For example and with reference to FIG. 8, base 50 is illustrated with its wheels removed such that convex bottom 52 provides the point of engagement with ground surface 300. In this way, base 50 with collector 20 coupled thereto via support legs 30 as described above is able to rock on ground surface 300 as indicated by two-headed arrow 54. The rocking capability of base 50 may prevent the system from being knocked down by wind and may also be used to achieve a desired orientation of collector 20 relative to ground surface 300. In some embodiments, stops (not shown) may be coupled to convex bottom 52 to limit or define the amount of rocking 54 that is permitted.

Figure 9:
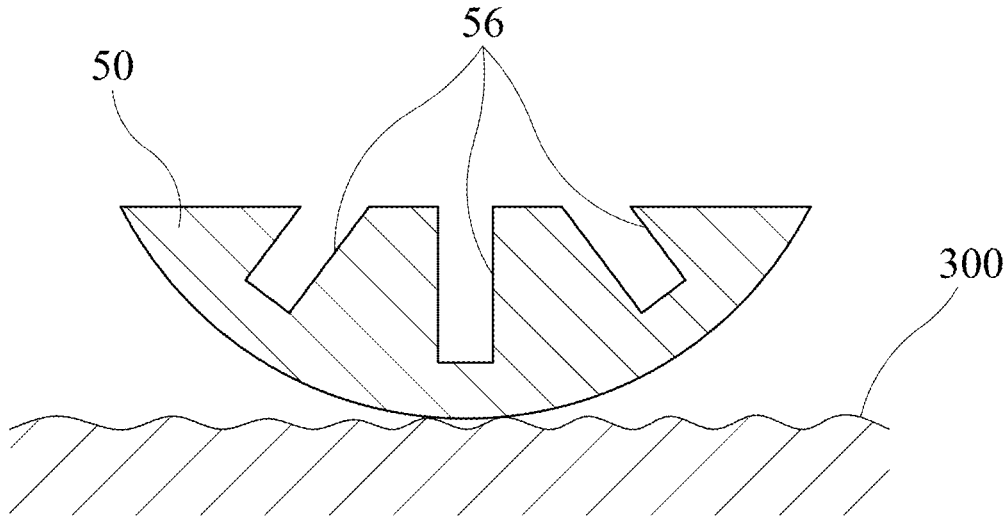
FIG. 9 is an isolated cross-sectional view of a convex-bottom base having multiple support-leg receptacles disposed at various angles in accordance with various aspects as described herein.

In some embodiments, a base used to support the collector via the support legs coupled thereto may include receptacles disposed at a variety of angles relative to the ground surface on which the base rests. For example, FIG. 9 illustrates a convex-bottom base 50 having receptacles 56 at various angles relative to ground surface 300. The choice of which receptacles 56 to use during an installation may be predicated on one or more factors such as wind speed, season, time of day, etc.

Figure 10:
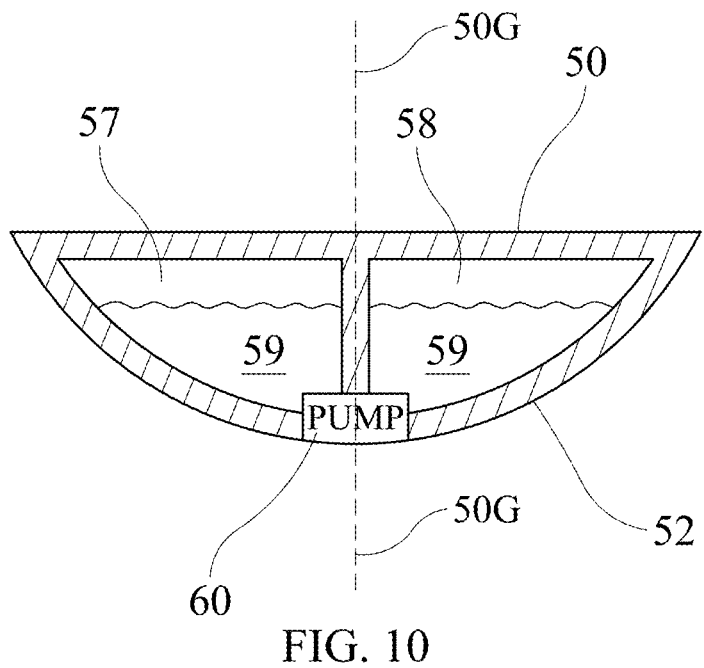
FIG. 10 is an isolated cross-sectional view of a convex-bottom base having a fluid-based tilt control incorporated with the base in accordance with various aspects as described herein.
Figure 11A:
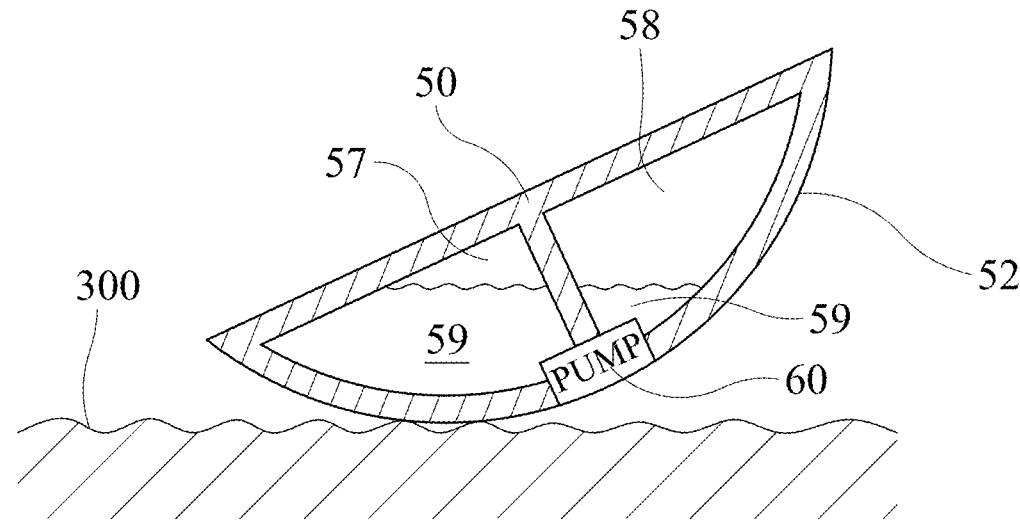
FIG. 11A is an isolated cross-sectional view of the convex-bottom base illustrated in FIG. 10 with the fluid-based tilt control operated to tilt the base along a first angle in accordance with various aspects as described herein.

In some embodiments, a convex-bottom base may include a tilt control mechanism using fluid to adjust a rocked position of the base on a ground or other surface. For example, FIG. 10 illustrates a convex-bottom base 50 (with or without wheels such as wheels 46 described above) having a hollow internal region divided into multiple sealed or sealable chambers. In the illustrated example, two chambers 57 and 58 are illustrated. However, it is to be understood that more than two chambers may be provided and distributed about the periphery of base 50. In some embodiments, the chambers are distributed about the base's center of gravity that is illustrated in FIG. 10 by a dashed line 50G. Water (or other liquid) 59 partially fills both chambers 57 and 58. A pump 60 coupled to base 50 (e.g., mounted on or in base 50) in fluid communication with each of chambers 57 and 58 is provided to pump water 59 between chambers 57 and 58 to control the tilt of the base. For example, when pump 60 pumps water 59 from chamber 58 into chamber 57 to thereby increase the amount of water in chamber 57, base 50 rocks on convex bottom 52 to tilt as shown in FIG. 11A. When pump 60 pumps water 59 from chamber 57 into chamber 58 to thereby increase the amount of water in chamber 58, base 50 rocks on convex bottom 52 to tilt as shown in FIG. 11B.

The tilting or orienting of convex-bottom base 50 via pump 60 may be controlled manually or automatically without departing from the scope of the present disclosure. Automatic control may be accomplished using a control system coupled to pump 60 that receives inputs from one or more of solar energy sensors, a GPS tracker detecting the base's latitude and longitude, cellular communications electronics, etc., the choice of which is not a limitation of the present disclosure. Such a tilt control system may be mounted on base 60 or be maintained at a remote location without departing from the scope of the present disclosure.

Figure 11B:
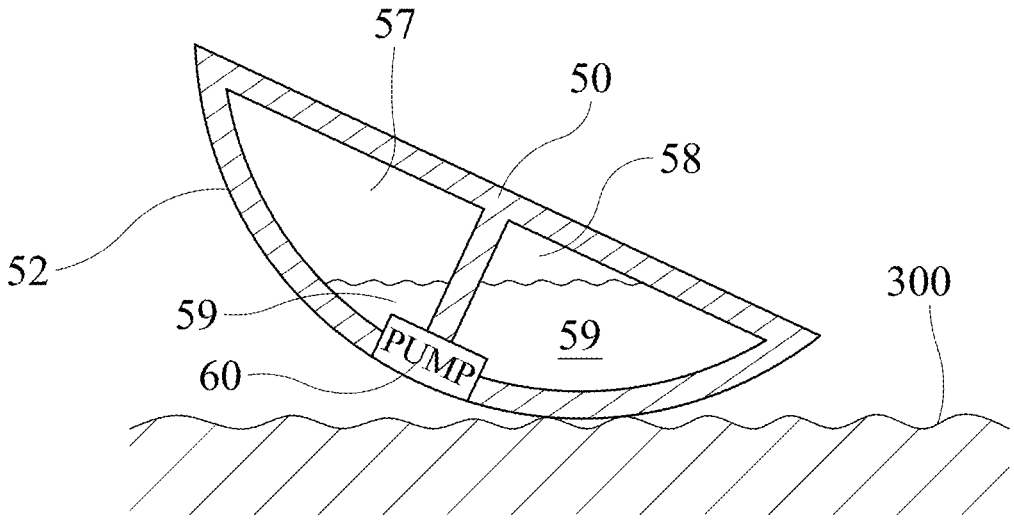
FIG. 11B is an isolated cross-sectional view of the convex-bottom base illustrated in FIG. 10 the fluid-based tilt control operated to tilt the base along a second angle in accordance with various aspects as described herein.
Figure 12A:
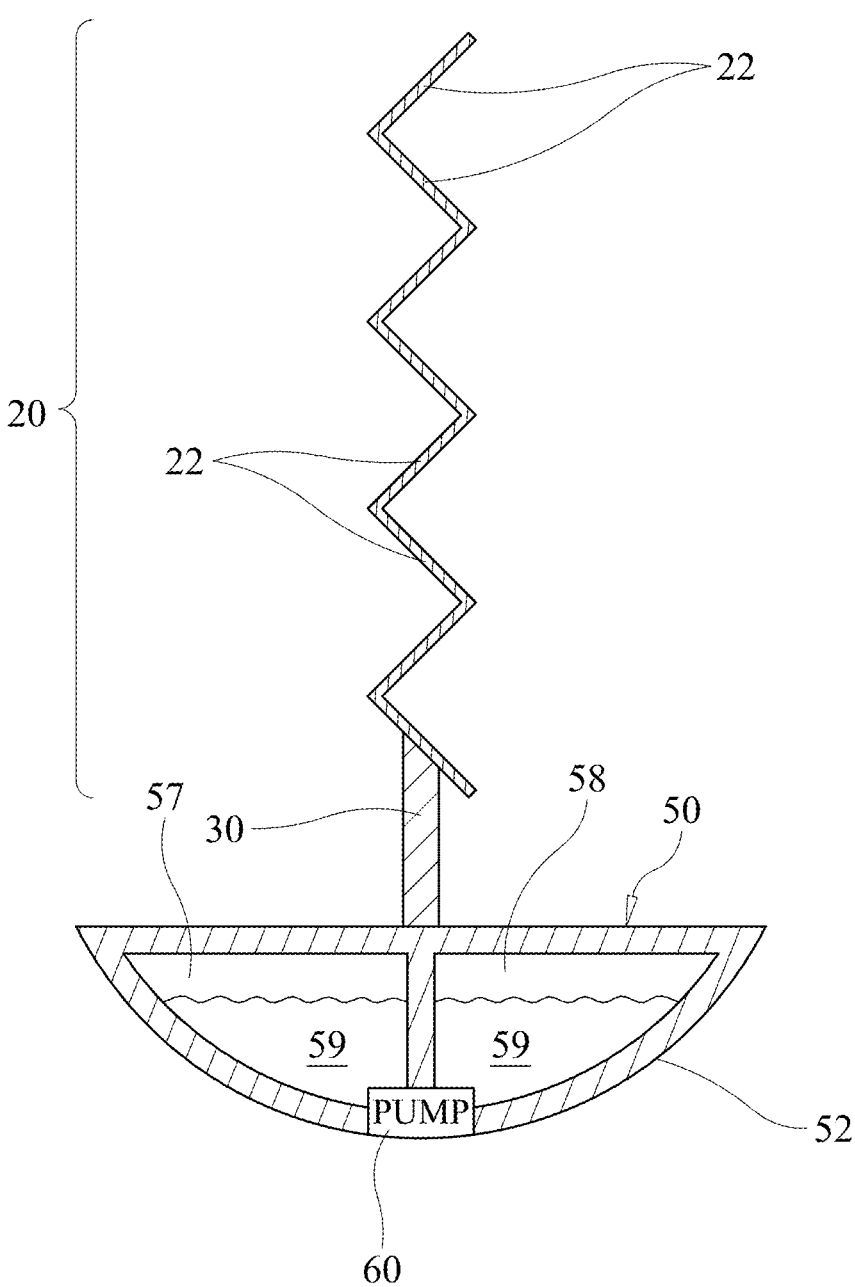
FIG. 12A is a cross-sectional view of an embodiment of a fluid-orienting solar energy collection system in accordance with various aspects as described herein.
Figure 12B:
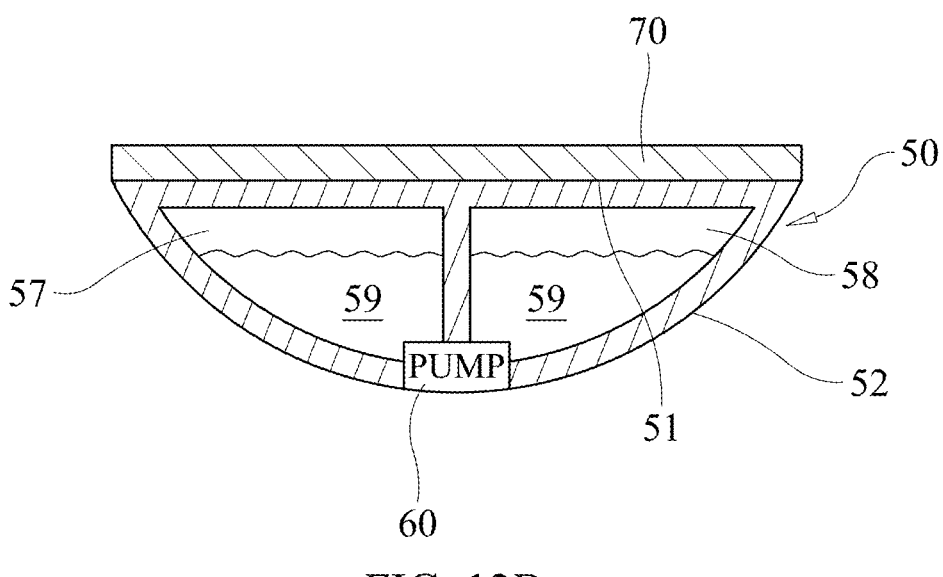
FIG. 12B is a cross-sectional view of another embodiment of a fluid-orienting solar energy collection system in accordance with various aspects as described herein.
Figure 12C:
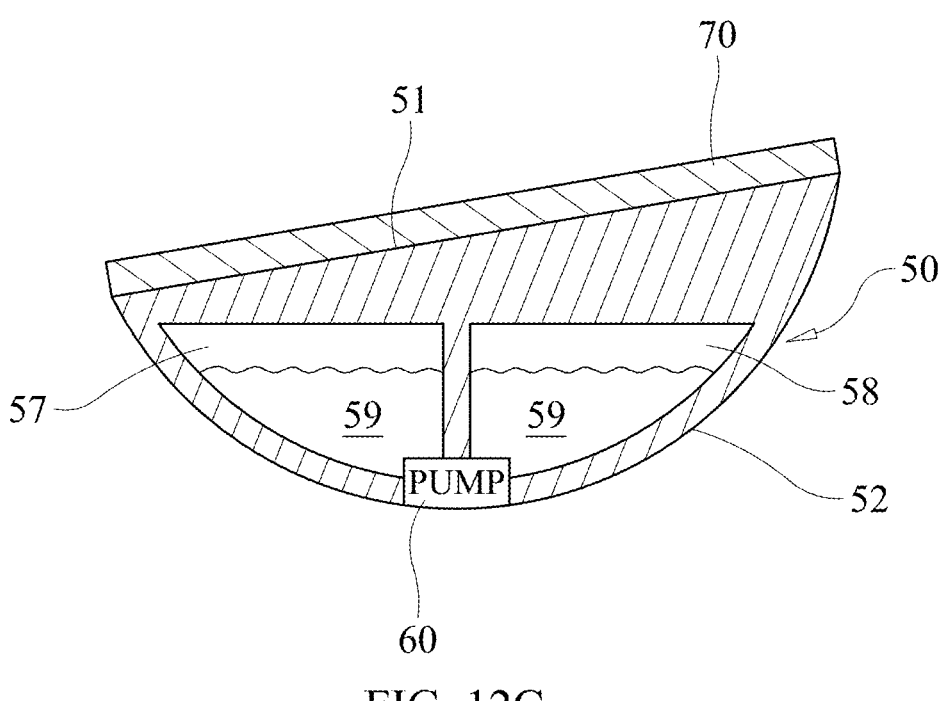
FIG. 12C is a cross-sectional view of another embodiment of a fluid-orienting solar energy collection system in accordance with various aspects as described herein.

The fluid-orienting convex-bottom base illustrated in FIGS. 10, 11A and 11B may be used to support or anchor the above-described triangular waveform collector 20 as illustrated in FIG. 12A. In some embodiments, flat-panel solar energy collectors may be supported or anchored at the top of the fluid-orienting convex-bottom base as illustrated in FIG. 12B where a flat solar energy collector 70 defined by one or more PV elements is attached to the top 51 of convex-bottom base 50. In some embodiments, a flat solar energy collector 70 may be propped up at an angle relative to the top 51 of the fluid-orienting convex-bottom base as illustrated in FIG. 12C where top 51 is configured as a ramp-like structure to define the angle for collector 70.

The above-described fluid-orienting convex-bottom base may have its convex bottom 52 shaped to support the rocking thereof to an orientation along a two-dimensional plane at a location where the base is situated, e.g., an east-to-west plane substantially coinciding with the sun's apparent morning-to-afternoon track. In such cases, convex bottom 52 may be defined by a semi-cylindrical shape. In some embodiments, the base's convex bottom may be semi-spherical in shape to support the rocking of the base to an orientation along a variety of directions to provide even greater control of tilt angle and orientation of the solar energy collector coupled to the base regardless of where the base is situated.

The advantages of the fluid-orienting solar collection methods and systems described herein are numerous. Solar energy collection may be established virtually anywhere and then optimized via orientation of a solar energy collector's base using fluid in the base. The unique fluid-orienting base allows the system to be readily positioned for solar energy collection throughout daylight hours. The herein-described approach to solar energy collection greatly increases the availability of solar energy for a wide variety of applications.

Although the methods and systems presented herein have been described for specific embodiments thereof, there are numerous variations and modifications that will be readily apparent to those skilled in the art in light of the above teachings. For example, the base may additionally be configured for storage of tools, batteries for storage of the collected solar energy, electrical outlets for accessing the collected solar energy, sensors for use in optimizing a location and orientation for the system's collector, irrigation equipment, and other accessories for use by the system or with the system. A base's top surface may be shaped and/or be reflective to increase the amount of reflected solar energy available for collection. Bases may be constructed using modular elements with chambers in the various modular elements providing additional functionalities, e.g., energy storage and access, tool storage, etc. In some embodiments, plugs may be provided in the chamber walls to support filling and drainage of the chambers. It is therefore to be understood that, within the scope of the appended claims, the methods and systems presented herein may be practiced other than as specifically described.

What is claimed as new and desired to be secured by Letters Patent of the United States is:

1. A solar energy collection system, comprising:
   a base having a center of gravity, a convex bottom adapted to rest on a ground surface, and a set of chambers within said base and distributed about said center of gravity;
   a liquid partially filling each of said chambers;
   a pump mounted on said base and in fluid communication with each of said chambers, wherein a self-contained tilt controller includes said chambers, said liquid and said pump, said pump operable to distribute said liquid between said chambers, wherein said convex bottom is rocked on the ground surface to position said base at a tilt orientation relative to the ground surface based on the amount of said liquid in each of said chambers; and
   a solar energy collector mounted on said base, wherein said solar energy collector is arranged in a triangular waveform having adjacent linear legs defining a tooth of said triangular waveform, said triangular waveform extending upward from said base at said tilt orientation, each of said linear legs having opposing faces, each of said opposing faces including a photovoltaic element, and wherein said triangular waveform extends upward from said base relative to the ground surface along an imaginary line aligned with said center of gravity, wherein said imaginary line bisects each of said linear legs.

2. The solar energy collection system of claim 1, wherein said liquid comprises water.

3. The solar energy collection system of claim 1, wherein each said photovoltaic element is selected from the group consisting of monofacial photovoltaic elements and bifacial photovoltaic elements.

4. The solar energy collection system of claim 1, wherein said solar energy collector includes regions adapted for the passage of a flow of air.

5. The solar energy collection system of claim 1, further comprising:
   wheels coupled to said base.

6. A solar energy collection system, comprising:
   a base having a center of gravity, a semi-spherical bottom adapted to rest on a ground surface, and a hollow internal region divided into a set of chambers within said base and distributed about said center of gravity;
   a liquid partially filling each of said chambers;
   a pump mounted on said base and in fluid communication with each of said chambers, wherein a self-contained tilt controller includes said chambers, said liquid and said pump, said pump operable to distribute said liquid between said chambers, wherein said semi-spherical bottom is rocked along any rotational direction on the ground surface to position said base at a tilt orientation relative to the ground surface based on the amount of said liquid in each of said chambers; and
   a solar energy collector mounted on said base.

7. A solar energy collection system, comprising:
   a base having a center of gravity, a semi-spherical bottom adapted to rest on a ground surface, and a hollow internal region divided into a set of chambers within said base and distributed about said center of gravity;
   a liquid partially filling each of said chambers;
   a pump mounted on said base and in fluid communication with each of said chambers, wherein a self-contained tilt controller includes said chambers, said liquid and said pump, said pump operable to distribute said liquid between said chambers, wherein said semi-spherical bottom is rocked along any rotational direction on the ground surface to position said base at a tilt orientation relative to the ground surface based on the amount of said liquid in each of said chambers; and
   a solar energy collector mounted on said base, wherein said solar energy collector is arranged in a triangular waveform having adjacent linear legs defining a tooth of said triangular waveform, said triangular waveform aligned with said center of gravity and extending upward from said base at said tilt orientation, each of said linear legs having opposing faces, each of said opposing faces including a photovoltaic element, and wherein said triangular waveform extends upward from said base relative to the ground surface along an imaginary line aligned with said center of gravity, and wherein said imaginary line bisects each of said linear legs.

8. The solar energy collection system of claim 7, wherein said liquid comprises water.

9. The solar energy collection system of claim 7, wherein each said photovoltaic element is selected from the group consisting of monofacial photovoltaic elements and bifacial photovoltaic elements.

10. The solar energy collection system of claim 7, wherein said solar energy collector includes regions adapted for the passage of a flow of air.

11. The solar energy collection system of claim 7, further comprising:
   wheels coupled to said base.

12. A method, comprising:
   by a solar energy collection system that includes
   a base having a center of gravity, a convex bottom, and a set of chambers within the base and distributed about the center of gravity,
   a liquid partially filling each of the chambers,
   a pump mounted on the base, and
   a solar energy collector mounted on the base and having a set of solar energy collecting legs where the solar energy collector extends upward from the base relative to the ground surface along an imaginary line that is aligned with the center of gravity and where the imaginary line bisects each of the solar energy collecting legs,
   positioning the solar energy collection system at a location having a ground surface exposed to solar energy with the convex bottom resting on the ground surface; and
   distributing, via operation of the pump, the liquid between the chambers to tilt the base to a tilt orientation relative to the ground surface based on the amount of the liquid in each of the chambers, wherein the solar energy collector is positioned at the tilt orientation to receive the solar energy at the location.

13. The method of claim 12, wherein the liquid comprises water.

14. The method of claim 12, wherein the solar energy collecting legs are arranged in a triangular waveform having adjacent linear legs defining a tooth of said triangular waveform with each of the linear legs having opposing faces and with each of the opposing faces including a photovoltaic element, the triangular waveform extending upward from the base at the tilt orientation, and further comprising:
   controlling the step of distributing to orient the solar energy collector at the location so that (i) each tooth of the triangular waveform extends horizontally relative to the ground surface, (ii) one of the linear legs of each tooth of the triangular waveform is positioned to directly receive solar energy during morning hours at the location and indirectly receive solar energy during afternoon hours at the location, and (iii) the other of the linear legs of each tooth of the triangular waveform is positioned to directly receive solar energy during afternoon hours at the location and indirectly receive solar energy during morning hours at the location.

* * * * *